(12) United States Patent
Muller et al.

(10) Patent No.: US 9,518,638 B2
(45) Date of Patent: Dec. 13, 2016

(54) MULTI-SPEED TRANSMISSION

(71) Applicant: Allison Transmission, Inc., Indianapolis, IN (US)

(72) Inventors: Jorg Muller, Chemnitz (DE); Rico Resch, Chemnitz (DE); Mirko Leesch, Gelenau (DE)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 14/919,864

(22) Filed: Oct. 22, 2015

(65) Prior Publication Data

US 2016/0116028 A1     Apr. 28, 2016

Related U.S. Application Data

(60) Provisional application No. 62/069,028, filed on Oct. 27, 2014.

(51) Int. Cl.
    *F16H 3/66*      (2006.01)

(52) U.S. Cl.
    CPC ........... *F16H 3/66* (2013.01); *F16H 2200/006* (2013.01); *F16H 2200/2012* (2013.01); *F16H 2200/2043* (2013.01)

(58) Field of Classification Search
None
See application file for complete search history.

(56) References Cited

U.S. PATENT DOCUMENTS

| | | |
|---|---|---|
| 6,176,803 B1 | 1/2001 | Meyer et al. |
| 6,910,985 B2 | 6/2005 | Ishimaru et al. |
| 6,955,627 B2 | 10/2005 | Thomas et al. |
| 6,984,187 B2 | 1/2006 | Biermann |
| 7,101,305 B2 | 9/2006 | Tabata et al. |
| 7,226,381 B2 | 6/2007 | Klemen |
| 7,429,230 B2 | 9/2008 | Ziemer |
| 7,549,942 B2 | 6/2009 | Gumpoltsberger |
| 7,556,528 B1 | 7/2009 | Ju |
| 7,566,283 B2 | 7/2009 | Gumpoltsberger |
| 7,575,533 B2 | 8/2009 | Gumpoltsberger |
| 7,632,206 B2 | 12/2009 | Gumpoltsberger |
| 7,651,431 B2 | 1/2010 | Phillips et al. |
| 7,674,200 B2 | 3/2010 | Shim |
| 7,686,730 B2 | 3/2010 | Baldwin |
| 7,691,022 B2 | 4/2010 | Phillips et al. |
| 7,691,024 B2 | 4/2010 | Phillips et al. |
| 7,695,398 B2 | 4/2010 | Phillips et al. |

(Continued)

*Primary Examiner* — Justin Holmes
(74) *Attorney, Agent, or Firm* — Taft Stettinius & Hollister LLP

(57) ABSTRACT

The present disclosure provides a multiple speed transmission having an input member, an output member, a plurality of planetary gearsets, a plurality of interconnecting members and a plurality of torque-transmitting mechanisms. The plurality of planetary gear sets includes first, second and third members. The input member is continuously interconnected with at least one member of one of the plurality of planetary gear sets, and the output member is continuously interconnected with another member of one of the plurality of planetary gear sets. At least eight forward speeds and one reverse speed are achieved by the selective engagement of the five torque-transmitting mechanisms.

20 Claims, 3 Drawing Sheets

(56) References Cited

U.S. PATENT DOCUMENTS

| | | | |
|---|---|---|---|
| 7,699,735 B2 * | 4/2010 | Conlon | B60K 6/365 180/65.225 |
| 7,704,181 B2 | 4/2010 | Phillips et al. | |
| 7,722,496 B2 | 5/2010 | Phillips et al. | |
| 7,727,104 B2 | 6/2010 | Shim | |
| 7,731,625 B2 | 6/2010 | Phillips et al. | |
| 7,736,263 B2 | 6/2010 | Phillips et al. | |
| 7,753,820 B2 | 7/2010 | Phillips et al. | |
| 7,771,306 B2 | 8/2010 | Phillips et al. | |
| 7,828,690 B2 | 11/2010 | Wittkopp et al. | |
| 7,841,960 B2 | 11/2010 | Baldwin | |
| 7,846,057 B2 | 12/2010 | Shim | |
| 7,846,058 B2 | 12/2010 | Kim | |
| 7,850,568 B2 | 12/2010 | Shim | |
| 7,850,569 B2 | 12/2010 | Seo et al. | |
| 7,887,454 B2 | 2/2011 | Phillips et al. | |
| 7,909,729 B2 | 3/2011 | Tanaka et al. | |
| 7,914,414 B2 | 3/2011 | Phillips et al. | |
| 7,946,948 B2 | 5/2011 | Phillips et al. | |
| 7,980,988 B2 | 7/2011 | Phillips et al. | |
| 7,985,159 B2 | 7/2011 | Phillips et al. | |
| 7,988,586 B2 | 8/2011 | Phillips et al. | |
| 7,993,235 B2 | 8/2011 | Wittkopp et al. | |
| 7,993,237 B2 | 8/2011 | Wittkopp et al. | |
| 7,993,238 B2 | 8/2011 | Phillips et al. | |
| 7,998,013 B2 | 8/2011 | Phillips et al. | |
| 8,001,662 B1 | 8/2011 | Guber | |
| 8,007,394 B2 | 8/2011 | Phillips et al. | |
| 8,007,395 B2 | 8/2011 | Wittkopp et al. | |
| 8,007,398 B2 | 8/2011 | Phillips et al. | |
| 8,016,713 B2 | 9/2011 | Phillips et al. | |
| 8,033,948 B2 | 10/2011 | Phillips et al. | |
| 8,038,565 B2 | 10/2011 | Phillips et al. | |
| 8,038,566 B2 | 10/2011 | Phillips et al. | |
| 8,043,189 B2 | 10/2011 | Phillips et al. | |
| 8,043,192 B2 | 10/2011 | Phillips et al. | |
| 8,047,950 B2 | 11/2011 | Wittkopp et al. | |
| 8,047,951 B2 | 11/2011 | Wittkopp et al. | |
| 8,047,954 B2 | 11/2011 | Phillips et al. | |
| 8,052,566 B2 | 11/2011 | Wittkopp et al. | |
| 8,052,567 B2 | 11/2011 | Hart et al. | |
| 8,057,349 B2 | 11/2011 | Phillips et al. | |
| 8,070,646 B2 | 12/2011 | Hart et al. | |
| 8,079,932 B2 | 12/2011 | Phillips et al. | |
| 8,088,032 B2 | 1/2012 | Gumpoltsberger et al. | |
| 8,096,915 B2 | 1/2012 | Wittkopp et al. | |
| 8,100,808 B2 | 1/2012 | Wittkopp et al. | |
| 8,105,198 B2 | 1/2012 | Hart et al. | |
| 8,128,527 B2 | 3/2012 | Hart et al. | |
| 8,142,324 B2 | 3/2012 | Phillips et al. | |
| 8,142,325 B2 | 3/2012 | Phillips et al. | |
| 8,152,681 B2 | 4/2012 | Seo et al. | |
| 8,157,697 B2 | 4/2012 | Hart et al. | |
| 8,167,765 B2 | 5/2012 | Phillips et al. | |
| 8,167,766 B2 | 5/2012 | Phillips et al. | |
| 8,187,130 B1 | 5/2012 | Mellet et al. | |
| 8,187,137 B2 | 5/2012 | Carey et al. | |
| 8,197,376 B2 | 6/2012 | Gumpoltsberger et al. | |
| 8,202,190 B2 | 6/2012 | Phillips et al. | |
| 8,206,257 B2 | 6/2012 | Gumpoltsberger et al. | |
| 8,210,981 B2 | 7/2012 | Bauknecht et al. | |
| 8,210,982 B2 | 7/2012 | Gumpoltsberger et al. | |
| 8,210,983 B2 | 7/2012 | Gumpoltsberger et al. | |
| 8,231,495 B2 | 7/2012 | Gumpoltsberger et al. | |
| 8,231,496 B2 | 7/2012 | Gumpoltsberger et al. | |
| 8,231,501 B2 | 7/2012 | Gumpoltsberger et al. | |
| 8,241,170 B2 | 8/2012 | Gumpoltsberger et al. | |
| 8,241,171 B2 | 8/2012 | Gumpoltsberger et al. | |
| 8,246,504 B2 | 8/2012 | Gumpoltsberger et al. | |
| 8,251,856 B2 | 8/2012 | Phillips et al. | |
| 8,251,857 B1 | 8/2012 | Mellet et al. | |
| 8,251,859 B2 | 8/2012 | Gumpoltsberger et al. | |
| 8,277,355 B2 | 10/2012 | Hart et al. | |
| 8,287,420 B2 | 10/2012 | Gumpoltsberger et al. | |
| 8,303,453 B2 | 11/2012 | Wittkopp et al. | |
| 8,303,455 B2 | 11/2012 | Gumpoltsberger et al. | |
| 8,303,456 B2 | 11/2012 | Kim | |
| 8,328,678 B2 | 12/2012 | Seo et al. | |
| 8,328,679 B2 | 12/2012 | Jang et al. | |
| 8,333,676 B2 | 12/2012 | Kim | |
| 8,343,005 B2 | 1/2013 | Hart et al. | |
| 8,366,580 B2 | 2/2013 | Wittkopp et al. | |
| 8,371,982 B2 | 2/2013 | Lee et al. | |
| 8,376,893 B2 | 2/2013 | Wittkopp et al. | |
| 8,376,895 B2 | 2/2013 | Saitoh et al. | |
| 8,382,634 B2 | 2/2013 | Beck et al. | |
| 8,398,522 B2 | 3/2013 | Bauknecht et al. | |
| 8,403,803 B2 | 3/2013 | Gumpoltsberger et al. | |
| 8,409,047 B2 | 4/2013 | Borgerson et al. | |
| 8,414,445 B2 | 4/2013 | Carey et al. | |
| 8,414,446 B2 | 4/2013 | Beck et al. | |
| 8,419,587 B2 | 4/2013 | Gumpoltsberger et al. | |
| 8,425,367 B2 | 4/2013 | Phillips et al. | |
| 8,425,368 B2 | 4/2013 | Phillips et al. | |
| 8,425,369 B2 | 4/2013 | Wittkopp et al. | |
| 8,425,370 B2 | 4/2013 | Leesch et al. | |
| 8,430,784 B2 | 4/2013 | Hart et al. | |
| 8,430,785 B2 | 4/2013 | Beck et al. | |
| 8,435,153 B2 | 5/2013 | Phillips et al. | |
| 8,444,524 B2 | 5/2013 | Gumpoltsberger et al. | |
| 8,444,525 B2 | 5/2013 | Gumpoltsberger et al. | |
| 8,460,151 B2 | 6/2013 | Wittkopp et al. | |
| 8,465,390 B2 | 6/2013 | Brehmer et al. | |
| 8,480,533 B2 | 7/2013 | Meyer et al. | |
| 8,485,934 B2 | 7/2013 | Gumpoltsberger et al. | |
| 8,496,558 B2 | 7/2013 | Wittkopp et al. | |
| 8,506,442 B2 | 8/2013 | Mellet et al. | |
| 8,512,196 B2 | 8/2013 | Mellet et al. | |
| 8,523,729 B2 | 9/2013 | Hart et al. | |
| 8,529,394 B2 | 9/2013 | Gumpoltsberger et al. | |
| 8,529,395 B2 | 9/2013 | Wittkopp et al. | |
| 8,529,396 B1 | 9/2013 | Vernon et al. | |
| 8,545,362 B1 | 10/2013 | Goleski et al. | |
| 8,556,766 B2 | 10/2013 | Mellet et al. | |
| 8,556,768 B2 | 10/2013 | Park et al. | |
| 8,574,113 B1 | 11/2013 | Goleski | |
| 8,574,114 B2 | 11/2013 | Brehmer et al. | |
| 8,591,364 B2 | 11/2013 | Hart | |
| 8,591,377 B1 | 11/2013 | Hoffman et al. | |
| 8,597,152 B2 | 12/2013 | Seo et al. | |
| 8,597,153 B2 | 12/2013 | Saitoh et al. | |
| 8,602,934 B2 | 12/2013 | Mellet et al. | |
| 8,608,612 B2 | 12/2013 | Park et al. | |
| 8,617,022 B1 | 12/2013 | Vernon et al. | |
| 8,636,617 B2 | 1/2014 | Singh | |
| 8,636,618 B2 | 1/2014 | Hart et al. | |
| 8,647,227 B2 | 2/2014 | Park et al. | |
| 8,663,053 B2 | 3/2014 | Beck et al. | |
| 8,663,056 B2 | 3/2014 | Gumpoltsberger et al. | |
| 8,678,972 B2 | 3/2014 | Wittkopp et al. | |
| 8,702,554 B2 | 4/2014 | Gumpoltsberger et al. | |
| 8,702,555 B1 | 4/2014 | Hart et al. | |
| 8,708,862 B2 | 4/2014 | Scherer et al. | |
| 8,721,488 B2 | 5/2014 | Mellet et al. | |
| 8,721,492 B2 | 5/2014 | Fellmann et al. | |
| 8,727,929 B2 | 5/2014 | Beck et al. | |
| 8,734,285 B2 | 5/2014 | Wilton et al. | |
| 8,734,286 B2 | 5/2014 | Coffey et al. | |
| 8,758,187 B2 | 6/2014 | Mellet et al. | |
| 8,758,189 B2 | 6/2014 | Hart et al. | |
| 8,777,797 B2 | 7/2014 | Mellet et al. | |
| 8,777,798 B2 | 7/2014 | Borgerson et al. | |
| 8,801,563 B2 | 8/2014 | Ohnemus et al. | |
| 8,801,565 B2 | 8/2014 | Hart et al. | |
| 8,821,336 B2 | 9/2014 | Wilton et al. | |
| 8,858,387 B2 | 10/2014 | Haupt et al. | |
| 8,864,618 B1 | 10/2014 | Noh et al. | |
| 8,888,648 B2 | 11/2014 | Mellet et al. | |
| 8,894,535 B2 | 11/2014 | Mellet et al. | |
| 8,915,819 B2 | 12/2014 | Coffey et al. | |
| 8,920,281 B2 | 12/2014 | Mellet et al. | |
| 8,939,863 B2 | 1/2015 | Hart et al. | |
| 8,951,160 B2 | 2/2015 | Vernon et al. | |
| 8,961,355 B2 | 2/2015 | Hart et al. | |

(56) References Cited

U.S. PATENT DOCUMENTS

| | | |
|---|---|---|
| 8,961,356 B2 | 2/2015 | Bockenstette et al. |
| 8,968,142 B2 | 3/2015 | Lippert |
| 8,968,144 B2 | 3/2015 | Janson et al. |
| 2006/0205556 A1 | 9/2006 | Klemen |
| 2006/0223666 A1 | 10/2006 | Gumpoltsberger |
| 2007/0207891 A1 | 9/2007 | Gumpoltsberger |
| 2007/0213168 A1 | 9/2007 | Gumpoltsberger |
| 2008/0070740 A1 | 3/2008 | Gumpoltsberger |
| 2008/0125269 A1 | 5/2008 | Gumpoltsberger |
| 2008/0207381 A1* | 8/2008 | Wittkopp ............... F16H 3/66 475/276 |
| 2008/0300092 A1 | 12/2008 | Phillips et al. |
| 2009/0011891 A1 | 1/2009 | Phillips et al. |
| 2009/0017964 A1 | 1/2009 | Phillips et al. |
| 2009/0017965 A1 | 1/2009 | Phillips et al. |
| 2009/0017966 A1 | 1/2009 | Phillips et al. |
| 2009/0017971 A1 | 1/2009 | Phillips et al. |
| 2009/0017976 A1 | 1/2009 | Phillips et al. |
| 2009/0017977 A1 | 1/2009 | Phillips et al. |
| 2009/0017979 A1 | 1/2009 | Phillips et al. |
| 2009/0017980 A1 | 1/2009 | Phillips et al. |
| 2009/0036253 A1 | 2/2009 | Phillips et al. |
| 2009/0036256 A1* | 2/2009 | Hukill ............... F16H 3/666 475/276 |
| 2009/0048059 A1 | 2/2009 | Phillips et al. |
| 2009/0048062 A1 | 2/2009 | Seo et al. |
| 2009/0054196 A1 | 2/2009 | Phillips et al. |
| 2009/0118059 A1 | 5/2009 | Phillips et al. |
| 2009/0118062 A1 | 5/2009 | Phillips et al. |
| 2009/0124448 A1 | 5/2009 | Wittkopp et al. |
| 2009/0192009 A1 | 7/2009 | Phillips et al. |
| 2009/0192010 A1 | 7/2009 | Wittkopp et al. |
| 2009/0192011 A1 | 7/2009 | Wittkopp et al. |
| 2009/0192012 A1 | 7/2009 | Phillips et al. |
| 2009/0197733 A1 | 8/2009 | Phillips et al. |
| 2009/0197734 A1 | 8/2009 | Phillips et al. |
| 2009/0209387 A1 | 8/2009 | Phillips et al. |
| 2009/0209389 A1 | 8/2009 | Phillips et al. |
| 2009/0215580 A1 | 8/2009 | Hart et al. |
| 2009/0280947 A1 | 11/2009 | Seo et al. |
| 2010/0041508 A1 | 2/2010 | Gumpoltsberger et al. |
| 2010/0041509 A1 | 2/2010 | Gumpoltsberger et al. |
| 2010/0069195 A1 | 3/2010 | Baldwin |
| 2010/0190600 A1 | 7/2010 | Phillips et al. |
| 2010/0210392 A1 | 8/2010 | Hart et al. |
| 2010/0210393 A1 | 8/2010 | Phillips et al. |
| 2010/0210394 A1 | 8/2010 | Phillips et al. |
| 2010/0210395 A1 | 8/2010 | Phillips et al. |
| 2010/0210396 A1 | 8/2010 | Wittkopp et al. |
| 2010/0210398 A1 | 8/2010 | Hart et al. |
| 2010/0210400 A1 | 8/2010 | Phillips et al. |
| 2010/0210401 A1 | 8/2010 | Phillips et al. |
| 2010/0210402 A1 | 8/2010 | Phillips et al. |
| 2010/0210403 A1 | 8/2010 | Wittkopp et al. |
| 2010/0210404 A1 | 8/2010 | Phillips et al. |
| 2010/0210405 A1 | 8/2010 | Phillips et al. |
| 2010/0210406 A1 | 8/2010 | Phillips et al. |
| 2010/0210937 A1 | 8/2010 | Tearney et al. |
| 2010/0216589 A1 | 8/2010 | Hart et al. |
| 2010/0216590 A1 | 8/2010 | Phillips et al. |
| 2010/0216591 A1 | 8/2010 | Wittkopp et al. |
| 2010/0227729 A1 | 9/2010 | Wittkopp et al. |
| 2010/0279814 A1 | 11/2010 | Brehmer et al. |
| 2010/0331136 A1 | 12/2010 | Jang et al. |
| 2011/0009229 A1 | 1/2011 | Bauknecht et al. |
| 2011/0045936 A1 | 2/2011 | Gumpoltsberger et al. |
| 2011/0045937 A1 | 2/2011 | Gumpoltsberger et al. |
| 2011/0045938 A1 | 2/2011 | Gumpoltsberger et al. |
| 2011/0045939 A1 | 2/2011 | Gumpoltsberger et al. |
| 2011/0045940 A1 | 2/2011 | Gumpoltsberger et al. |
| 2011/0045942 A1 | 2/2011 | Gumpoltsberger et al. |
| 2011/0045943 A1 | 2/2011 | Gumpoltsberger et al. |
| 2011/0124462 A1 | 5/2011 | Meyer et al. |
| 2011/0136615 A1 | 6/2011 | Phillips et al. |
| 2011/0183807 A1 | 7/2011 | Gumpoltsberger et al. |
| 2011/0212806 A1 | 9/2011 | Phillips et al. |
| 2011/0245013 A1 | 10/2011 | Kim |
| 2011/0245026 A1 | 10/2011 | Phillips et al. |
| 2011/0251014 A1 | 10/2011 | Leesch et al. |
| 2011/0275472 A1 | 11/2011 | Phillips et al. |
| 2011/0294617 A1 | 12/2011 | Seo et al. |
| 2012/0004066 A1 | 1/2012 | Seo et al. |
| 2012/0053004 A1 | 3/2012 | Beck et al. |
| 2012/0053005 A1 | 3/2012 | Beck et al. |
| 2012/0053008 A1 | 3/2012 | Beck et al. |
| 2012/0058856 A1 | 3/2012 | Phillips et al. |
| 2012/0065019 A1 | 3/2012 | Hart et al. |
| 2012/0108382 A1 | 5/2012 | Saitoh et al. |
| 2012/0108383 A1 | 5/2012 | Saitoh et al. |
| 2012/0115671 A1 | 5/2012 | Gumpoltsberger et al. |
| 2012/0115672 A1 | 5/2012 | Gumpoltsberger et al. |
| 2012/0122626 A1 | 5/2012 | Gumpoltsberger et al. |
| 2012/0122627 A1 | 5/2012 | Gumpoltsberger et al. |
| 2012/0135834 A1 | 5/2012 | Gumpoltsberger et al. |
| 2012/0135835 A1 | 5/2012 | Gumpoltsberger et al. |
| 2012/0149525 A1 | 6/2012 | Gumpoltsberger et al. |
| 2012/0149526 A1 | 6/2012 | Gumpoltsberger et al. |
| 2012/0149527 A1 | 6/2012 | Gumpoltsberger et al. |
| 2012/0172172 A1 | 7/2012 | Gumpoltsberger et al. |
| 2012/0178564 A1 | 7/2012 | Vahabzadeh et al. |
| 2012/0178572 A1 | 7/2012 | Hart et al. |
| 2012/0178579 A1 | 7/2012 | Hart et al. |
| 2012/0178580 A1 | 7/2012 | Wittkopp et al. |
| 2012/0178581 A1 | 7/2012 | Wittkopp et al. |
| 2012/0178582 A1 | 7/2012 | Wittkopp et al. |
| 2012/0196718 A1 | 8/2012 | Hart et al. |
| 2012/0214632 A1 | 8/2012 | Mellet et al. |
| 2012/0214633 A1 | 8/2012 | Mellet et al. |
| 2012/0214636 A1 | 8/2012 | Hart et al. |
| 2012/0214637 A1 | 8/2012 | Hart et al. |
| 2012/0214638 A1 | 8/2012 | Hart et al. |
| 2012/0231917 A1 | 9/2012 | Phillips et al. |
| 2012/0231920 A1 | 9/2012 | Wittkopp et al. |
| 2012/0295754 A1 | 11/2012 | Hart et al. |
| 2012/0329600 A1 | 12/2012 | Park et al. |
| 2013/0029799 A1 | 1/2013 | Park et al. |
| 2013/0040776 A1 | 2/2013 | Mellet et al. |
| 2013/0085031 A1 | 4/2013 | Bassi et al. |
| 2013/0085033 A1 | 4/2013 | Wittkopp et al. |
| 2013/0150203 A1 | 6/2013 | Park et al. |
| 2013/0150204 A1 | 6/2013 | Park et al. |
| 2013/0187796 A1 | 7/2013 | Kim et al. |
| 2013/0203549 A1 | 8/2013 | Mellet et al. |
| 2013/0237365 A1 | 9/2013 | Coffey et al. |
| 2013/0252780 A1 | 9/2013 | Ohnemus et al. |
| 2013/0274060 A1* | 10/2013 | Beck ............... F16H 3/666 475/276 |
| 2013/0310211 A1 | 11/2013 | Wilton et al. |
| 2014/0128199 A1* | 5/2014 | Coffey ............... F16H 3/666 475/276 |
| 2015/0267780 A1* | 9/2015 | Meyer ............... F16H 3/66 475/279 |

* cited by examiner

| Gear State | Gear Ratio | Gear Step | Torque Transmitting Mechanisms ||||| 
| | | | C1 | C2 | C3 | C4 | C5 |
| --- | --- | --- | --- | --- | --- | --- | --- |
| Rev | -7.548 | | X | X | | | |
| Neu | | -0.79 | | | | | |
| 1st | 5.950 | | | X | | | X |
| 2nd | 3.890 | 1.53 | | X | X | | |
| 3rd | 2.490 | 1.56 | | | X | | X |
| 4th | 2.054 | 1.21 | X | | X | | |
| 5th | 1.619 | 1.27 | X | | | | X |
| 6th | 1.296 | 1.25 | | | X | X | |
| 7th | 1.000 | 1.30 | | | | X | X |
| 8th | 0.797 | 1.26 | X | | | X | |

Fig. 3

MULTI-SPEED TRANSMISSION

RELATED APPLICATIONS

This application claims priority to U.S. Provisional Patent Application Ser. No. 62/069,028, filed on Oct. 27, 2014, which is hereby incorporated by reference in its entirety.

FIELD OF THE DISCLOSURE

The present disclosure relates to a multiple speed transmission, and in particular to a multiple speed transmission capable of achieving eight or more speeds.

BACKGROUND

Multiple speed transmissions use a number of friction clutches or brakes, planetary gearsets, shafts, and other elements to achieve a plurality of gear or speed ratios. The architecture, i.e., packaging or layout of the aforementioned elements, is determined based on cost, size, packaging constraints, and desired ratios. There is a need for new architectural designs of multiple speed transmissions for achieving different ratios with improved performance, cost, efficiency, responsiveness, and packaging.

SUMMARY

In one embodiment of the present disclosure, a multiple speed transmission includes a multiple speed transmission includes an input member; an output member; first, second, third and fourth planetary gearsets each having first, second and third members; a plurality of interconnecting members each connected between at least one of the first, second, third, and fourth planetary gearsets and at least another of the first, second, third, and fourth planetary gearsets; a first torque-transmitting mechanism selectively engageable to interconnect the first member of the fourth planetary gearset with a stationary member; a second torque-transmitting mechanism selectively engageable to interconnect the second member of the first planetary gearset with a stationary member; a third torque-transmitting mechanism selectively engageable to interconnect the first member of the third planetary gearset with a stationary member; a fourth torque-transmitting mechanism selectively engageable to interconnect the first member of the first planetary gearset and the first member of the second planetary gearset with the second member of the first planetary gearset and the third member of the third planetary gearset; and a fifth torque-transmitting mechanism selectively engageable to interconnect the first member of the third planetary gearset with the second member of the fourth planetary gearset and the third member of the first planetary gearset; wherein the torque transmitting mechanisms are selectively engageable in combinations of at least two to establish at least eight forward speed ratios and at least one reverse speed ratio between the input member and the output member.

In one example of this embodiment, one member of the second planetary gearset is continuously interconnected with the input member and a different member of the second planetary gearset is continuously interconnected with the output member. In another example, the input member is continuously interconnected with the first member of the second planetary gearset and the output member is continuously interconnected with the second member of the second planetary gearset. In a third example, the selective engagement of the second torque-transmitting mechanism and third torque-transmitting mechanism interconnect two members of the same planetary gearset to the stationary member.

In a fourth example, the plurality of interconnecting members includes a first interconnecting member continuously interconnecting the second member of the first planetary gearset with the third member of the third planetary gearset. In a fifth example, the plurality of interconnecting members includes a second interconnecting member continuously interconnecting the third member of the first planetary gearset with the second member of the fourth planetary gearset. In a sixth example, the plurality of interconnecting members includes a third interconnecting member directly connected to the first member of the third planetary gearset. In a seventh example, the plurality of interconnecting members includes a fourth interconnecting member continuously interconnecting the third member of the second planetary gearset with the second member of the third planetary gearset and the third member of the fourth planetary gearset. In an eighth example, the plurality of interconnecting members includes a fifth interconnecting member directly connected to the first member of the fourth planetary gearset. In a ninth example, the second torque-transmitting mechanism is selectively engageable to interconnect the third member of the third planetary gearset with the stationary member.

In another embodiment of the present disclosure, a multiple speed transmission includes an input member; an output member; first, second, third and fourth planetary gearsets each having a sun gear, a ring gear, and a carrier member; a plurality of interconnecting members each connected between at least one of the first, second, third, and fourth planetary gearsets and at least another of the first, second, third, and fourth planetary gearsets; a first torque-transmitting mechanism selectively engageable to interconnect the sun gear of the fourth planetary gearset and the ring gear of the third planetary gearset with a stationary member; a second torque-transmitting mechanism selectively engageable to interconnect the carrier member of the first planetary gearset with a stationary member; a third torque-transmitting mechanism selectively engageable to interconnect the sun gear of the third planetary gearset with a stationary member; a fourth torque-transmitting mechanism selectively engageable to interconnect the sun gear of the first planetary gearset and the sun gear of the second planetary gearset with the carrier member of the first planetary gearset and the ring gear of the third planetary gearset; and a fifth torque-transmitting mechanism selectively engageable to interconnect the sun gear of the third planetary gearset with the carrier member of the fourth planetary gearset and the ring gear of the first planetary gearset; wherein the torque transmitting mechanisms are selectively engageable in combinations of at least two to establish at least eight forward speed ratios and at least one reverse speed ratio between the input member and the output member.

In one example of this embodiment, one member of the second planetary gearset is continuously interconnected with the input member and a different member of the second planetary gearset is continuously interconnected with the output member. In another example, the input member is continuously interconnected with the sun gear of the second planetary gearset and the output member is continuously interconnected with the carrier member of the second planetary gearset. In a third example, the selective engagement of the second torque-transmitting mechanism and third torque-transmitting mechanism interconnect two members of the same planetary gearset to the stationary member.

In a further example, the plurality of interconnecting members includes a first interconnecting member continuously interconnecting the carrier member of the first planetary gearset with the ring gear of the third planetary gearset. In a different example, the plurality of interconnecting members includes a second interconnecting member continuously interconnecting the ring gear of the first planetary gearset with the carrier member of the fourth planetary gearset. In yet another example, the plurality of interconnecting members includes a third interconnecting member directly connected to the sun gear of the third planetary gearset. In yet a further example, the plurality of interconnecting members includes a fourth interconnecting member continuously interconnecting the ring gear of the second planetary gearset with the carrier member of the third planetary gearset and the ring gear of the fourth planetary gearset. In another example, the plurality of interconnecting members includes a fifth interconnecting member directly connected to the sun gear of the fourth planetary gearset.

In a different embodiment of the present disclosure, a multiple speed transmission including an input member; an output member; first, second, third and fourth planetary gearsets each having a sun gear, a ring gear, and a carrier member; a plurality of interconnecting members each connected between at least one of the first, second, third, and fourth planetary gearsets and at least another of the first, second, third, and fourth planetary gearsets; a first torque-transmitting mechanism selectively engageable to interconnect the sun gear of the fourth planetary gearset and the ring gear of the third planetary gearset with a stationary member; a second torque-transmitting mechanism selectively engageable to interconnect the carrier member of the first planetary gearset with a stationary member; a third torque-transmitting mechanism selectively engageable to interconnect the sun gear of the third planetary gearset with a stationary member; a fourth torque-transmitting mechanism selectively engageable to interconnect the sun gear of the first planetary gearset and the sun gear of the second planetary gearset with the carrier member of the first planetary gearset and the ring gear of the third planetary gearset; and a fifth torque-transmitting mechanism selectively engageable to interconnect the sun gear of the third planetary gearset with the carrier member of the fourth planetary gearset and the ring gear of the first planetary gearset; a first interconnecting member of the plurality of interconnecting members continuously interconnecting the carrier member of the first planetary gearset with the ring gear of the third planetary gearset; a second interconnecting member of the plurality of interconnecting members continuously interconnecting the ring gear of the first planetary gearset with the carrier member of the fourth planetary gearset; a third interconnecting member of the plurality of interconnecting members directly connected to the sun gear of the third planetary gearset; a fourth interconnecting member of the plurality of interconnecting members continuously interconnecting the ring gear of the second planetary gearset with the carrier member of the third planetary gearset and the ring gear of the fourth planetary gearset; a fifth interconnecting member of the plurality of interconnecting members directly connected to the sun gear of the fourth planetary gearset; wherein the torque transmitting mechanisms are selectively engageable in combinations of at least two to establish at least eight forward speed ratios and at least one reverse speed ratio between the input member and the output member.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3 is a truth table presenting an example of a state of engagement of various torque transmitting mechanisms in each of the available forward and reverse speeds or gear ratios of the transmission illustrated in FIG. 2.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
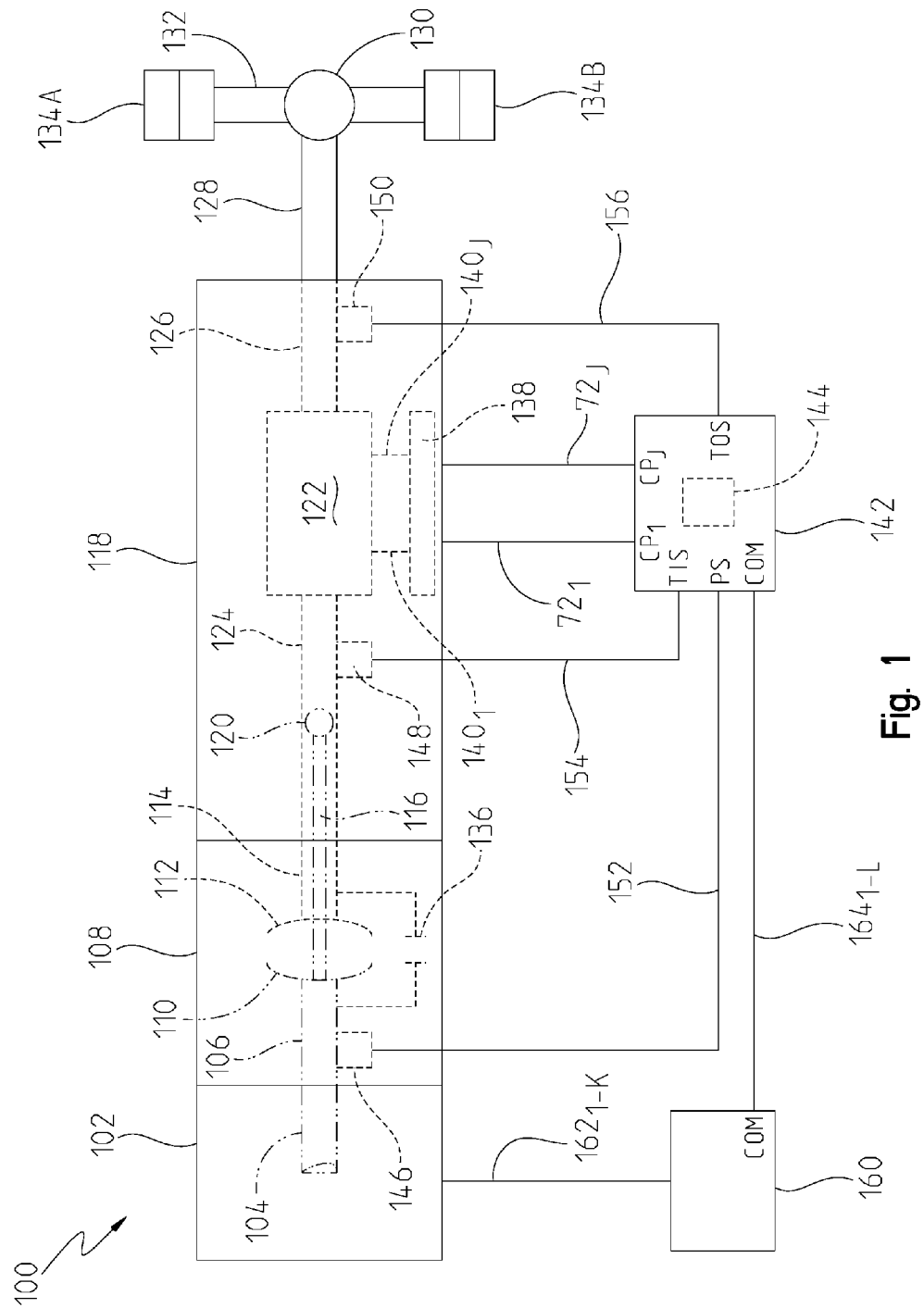
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
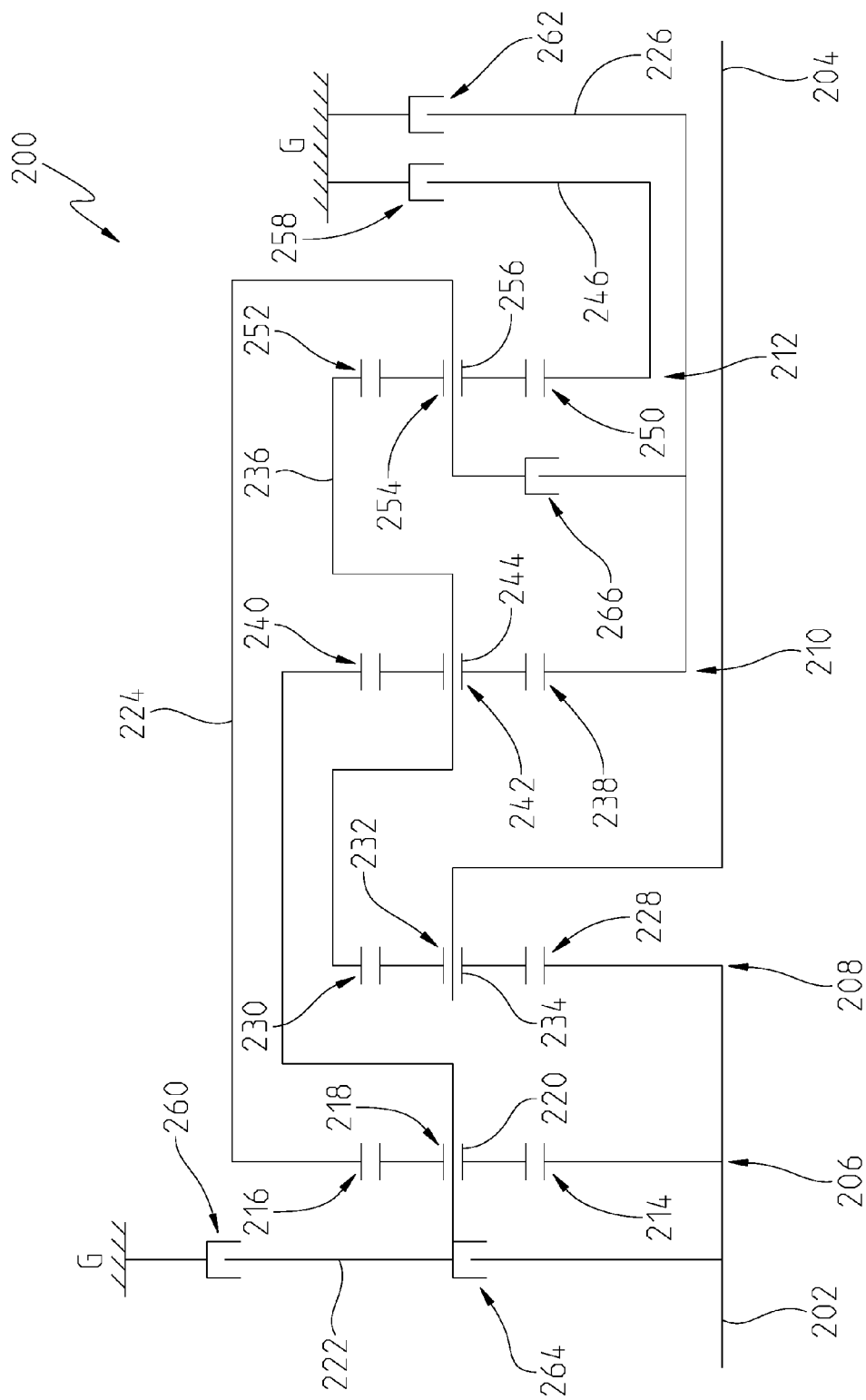
FIG. 2 is a diagrammatic view of an embodiment of a multiple speed transmission.

Referring to FIG. 2, a schematic representation or stick diagram illustrates one embodiment of a multi-speed transmission 200 according to the present disclosure. The transmission 200 includes an input shaft 202 and an output shaft 204. The input shaft 202 and output shaft 204 can be disposed along the same axis or centerline of the transmission 200. In another aspect, the different shafts can be disposed along different axes or centerlines. In a further aspect, the different shafts can be disposed parallel to one another, but along different axes or centerlines. Other aspect can be appreciated by one skilled in the art.

The transmission 200 can also include a plurality of planetary gearsets. In the illustrated embodiment of FIG. 2, the transmission 200 includes a first planetary gearset 206, a second planetary gearset 208, a third planetary gearset 210, and a fourth planetary gearset 212. Each planetary gearset can be referred to as a simple or compound planetary gearset. For example, in some aspects, one or more of the plurality of planetary gearsets can be formed as an idler planetary gearset. In FIG. 2, however, each of the planetary gearsets is represented as being a simple planetary gearset.

One or more of the plurality of planetary gearsets can be arranged in different locations within the transmission 200, but for sake of simplicity and in this particular example only, the planetary gearsets are aligned in an axial direction consecutively in sequence (i.e., first, second, third, and fourth between the input and output shafts).

The transmission 200 may also include a plurality of torque-transmitting or gearshifting mechanisms. For example, one or more of these mechanisms can include a clutch or brake. In one aspect, each of the plurality of mechanisms is disposed within an outer housing of the transmission 200. In another aspect, however, one or more of the mechanisms may be disposed outside of the housing. Each of the plurality of mechanisms can be coupled to one or more of the plurality of planetary gearsets, which will be described further below.

In the embodiment of FIG. 2, the transmission 200 can include a first torque-transmitting mechanism 258, a second torque-transmitting mechanism 260, and a third torque-transmitting mechanism 262 that are configured to function as brakes (e.g., the torque-transmitting mechanism is fixedly coupled to the outer housing of the transmission 200). Each brake can be configured as a shiftable-friction-locked disk brake, shiftable friction-locked band brake, shiftable form-locking claw or conical brake, or any other type of known brake. The transmission 200 can include a fourth torque-transmitting mechanism 264 and a fifth torque-transmitting mechanism 266 that are configured to function as clutches. These can be shiftable friction-locked multi-disk clutches, shiftable form-locking claw or conical clutches, wet clutches, or any other known form of a clutch. With these five torque-transmitting mechanisms, selective shifting of at least eight forward gears and at least one reverse gear is possible.

The transmission 200 of FIG. 2 may also include up to seven different shafts, which is inclusive of the input shaft 202 and output shaft 204. Each of these shafts, designated as a first shaft 222, a second shaft 224, a third shaft 226, a fourth shaft 236, and a fifth shaft 246 are configured to be connected to one or more of the plurality of planetary gearsets or plurality of torque-transmitting mechanism between the input shaft 202 and output shaft 204.

In FIG. 2, the first planetary gearset 206 can include a first sun gear 214, a first ring gear 216, and a first carrier member 218 that rotatably supports a set of pinion gears 220. The second planetary gearset 208 can include a second sun gear 228, a second ring gear 230, and a second carrier member 232 that rotatably supports a set of pinion gears 234. The third planetary gearset 210 can include a third sun gear 238, a third ring gear 240, and a third carrier member 242 that rotatably supports a set of pinion gears 244. The fourth planetary gearset 212 can include a fourth sun gear 250, a fourth ring gear 252, and a fourth carrier member 254 that rotatably supports a set of pinion gears 256.

The transmission 200 is capable of transferring torque from the input shaft 202 to the output shaft 204 in at least eight forward gears or ratios and at least one reverse gear or ratio. Each of the forward torque ratios and the reverse torque ratios can be attained by the selective engagement of one or more of the torque-transmitting mechanisms (i.e., torque-transmitting mechanisms 258, 260, 262, 264, and 266). Those skilled in the art will readily understand that a different speed ratio is associated with each torque ratio. Thus, at least eight forward speed ratios and at least one reverse speed ratio may be attained by transmission 200. An example of the gear ratios that may be obtained using the embodiments of the present disclosure are also shown in FIG. 3. Of course, other gear ratios are achievable depending on the gear diameter, gear tooth count and gear configuration selected.

As for the transmission 200, kinematic coupling of the first planetary gearset 206 is shown in FIG. 2. The first sun gear 214 is coupled to the input shaft 202 for common rotation therewith. The first ring gear 216 is coupled to the second shaft 224 for common rotation therewith. First pinion gears 220 are configured to intermesh with the first sun gear 214 and first ring gear 216. First carrier member 218 is coupled to the first shaft 222.

With respect to the second planetary gearset 208, the second sun gear 228 is coupled to the input shaft 202 and first sun gear 214 for common rotation therewith. The second ring gear 230 is coupled to the fourth shaft 236 for common rotation therewith. Second pinion gears 234 are configured to intermesh with the second sun gear 228 and second ring gear 230, and the second carrier member 232 is coupled for common rotation with the output shaft 204.

The third sun gear 238 of the third planetary gearset 210 is coupled to the third shaft 226 for common rotation therewith. The third ring gear 240 is coupled to the first shaft 222 and first carrier member 218 for common rotation therewith. Third pinion gears are configured to intermesh with the third sun gear 238 and third ring gear 240, and the third carrier member 242 is coupled for common rotation with the fourth shaft 236 and second ring gear 230.

The kinematic relationship of the fourth planetary gearset 212 is such that the fourth sun gear 250 is coupled to the fifth shaft 246 for common rotation therewith. The fourth ring gear 252 is coupled to the fourth shaft 236, and hence the second ring gear 230 and third carrier member 242, for common rotation therewith. The fourth pinion gears 256 are configured to intermesh with the fourth sun gear 250 and the fourth ring gear 252. The fourth carrier member 254 is coupled to the second shaft 224 and first ring gear 216 for common rotation therewith.

With regards to the kinematic coupling of the five torque-transmitting mechanisms to the previously described shafts, the multiple speed transmission 200 of FIG. 2 provides that the first torque-transmitting mechanism 258 is arranged within the power flow between the fifth shaft 246 and the housing G of the transmission 200. In this manner, the first torque-transmitting mechanism 258 is configured to act as a brake. The second torque-transmitting mechanism 260 is arranged within the power flow between the first shaft 222 and the housing G of the transmission 200. In this manner, the second torque-transmitting mechanism 260 is configured to also act as a brake. The third torque-transmitting mechanism 262 is arranged within the power flow between the third shaft 226 and the housing G of the transmission 200. In this manner, the third torque-transmitting mechanism 262 is configured to also act as a brake similar to the first and second torque-transmitting mechanisms. In this embodiment of the transmission 200 therefore three of the five torque-transmitting mechanisms are configured to act as a brake and the other two torque-transmitting mechanisms are configured to act as clutches.

The fourth torque-transmitting mechanism 264 is arranged within the power flow between the input shaft 202 and the first shaft 222. Moreover, the fifth torque-transmitting mechanism 266 is arranged within the power flow between the third shaft 226 and the second shaft 224.

The kinematic couplings of the embodiment in FIG. 2 can further be described with respect to the selective engagement of the torque-transmitting mechanisms with respect to one or more components of the plurality of planetary gearsets. For example, in the transmission 200, the first torque-transmitting mechanism 258 is selectively engageable to couple the fourth sun gear 250 and the fifth shaft 246 to the housing G of the transmission 200. The second torque-transmitting mechanism 260 is selectively engageable to couple the first carrier member 218, the third ring gear 240, and the first shaft to the housing G of the transmission 200. The third torque-transmitting mechanism 262 is selectively engageable to couple the third sun gear 238 and the third shaft 226 to the housing G of the transmission 200.

The fourth torque-transmitting mechanism 264 is selectively engageable to couple the first sun gear 214, the second sun gear 228, and the input shaft 202 to the first carrier member 218, the third ring gear 240, and the first shaft 222. Lastly, the fifth torque-transmitting mechanism 266 is selectively engageable to couple third sun gear 238 and the third shaft 226 to the first ring gear 216, the fourth carrier member 254, and the second shaft 224.

As previously described, the aforementioned embodiment is capable of transmitting torque from a respective input shaft to a respective output shaft in at least eight forward torque ratios and one reverse torque ratio. Referring to FIG. 3, one example of a truth table is shown representing a state of engagement of various torque transmitting mechanisms in each of the available forward and reverse speeds or gear ratios of the transmission illustrated in FIG. 2. It is to be understood that FIG. 3 is only one example of any number of truth tables possible for achieving at least eight forward ratios and one reverse ratio, and one skilled in the art is capable of configuring diameters, gear tooth counts, and gear configurations to achieve other ratios.

In the example of FIG. 3, the reverse ratio (Rev) can be achieved by the selective engagement of the torque-transmitting mechanisms as set forth in the table. As shown, the first torque-transmitting mechanism (C1) and the second torque-transmitting mechanism (C2) are selectively engaged to establish the reverse ratio. Thus, in transmission 200 of FIG. 2, the selective engagement of mechanisms 258 and 260 can establish the reverse ratio.

In neutral (Neu), none of the torque-transmitting mechanisms carry torque. One or more of the torque-transmitting mechanisms, however, may be engaged in neutral but not carrying torque. For example, the second torque-transmitting mechanism can be engaged in neutral, thereby resulting in the first torque-transmitting mechanism being disengaged between a shift between the one reverse ratio and neutral.

A first forward ratio (shown as 1st) in the table of FIG. 3 is achieved by engaging the second torque-transmitting mechanism 260 and the fifth torque-transmitting mechanism 266. Thus, when transitioning between neutral and the first forward range, the second torque-transmitting mechanism may already be engaged, and the fifth torque-transmitting mechanism is selectively engaged.

In a second or subsequent forward ratio, indicated as 2nd in FIG. 3, the second torque-transmitting mechanism and the third torque-transmitting mechanism are selectively engaged. Therefore, when transitioning between the first forward ratio and the second forward ratio, the fifth torque-transmitting mechanism is released and the third torque-transmitting mechanism is engaged.

In a third or subsequent forward ratio, indicated as 3rd forward ratio in FIG. 3, the third torque-transmitting mechanism and fifth torque-transmitting mechanism are engaged. To transition from the second forward ratio to the third forward ratio, for example, the second torque-transmitting mechanism is released and the fifth torque-transmitting mechanism is engaged.

In a fourth or the next subsequent forward ratio, indicated as 4th in FIG. 3, the first torque-transmitting mechanism and third torque-transmitting mechanism are engaged. Thus, to transition from the third forward ratio and upshift to the fourth forward ratio, the fifth torque-transmitting mechanism is released and the first torque-transmitting mechanism is engaged.

In a fifth or the next subsequent forward ratio, indicated as 5th in FIG. 3, the first torque-transmitting mechanism and fifth torque-transmitting mechanism are selectively engaged. Thus, to transition from the fourth forward ratio and upshift to the fifth forward ratio, the third torque-transmitting mechanism is released and the fifth torque-transmitting mechanism is engaged.

In a sixth or the next subsequent forward ratio, indicated as 6th in FIG. 3, the previously engaged torque-transmitting mechanisms are both released and two different torque-transmitting mechanisms are engaged. Here, for example, the third torque-transmitting mechanism and fourth torque-transmitting mechanism are engaged. Thus, to transition from the fifth forward ratio and upshift to the sixth forward ratio, the first and fifth torque-transmitting mechanisms are released and the third and fourth torque-transmitting mechanisms are engaged.

In a seventh or the next subsequent forward ratio, indicated as 7th in FIG. 3, the fourth torque-transmitting mechanism and the fifth torque-transmitting mechanism are engaged. Thus, to transition from the sixth forward ratio and upshift to the seventh forward ratio, the third torque-transmitting mechanism is released and the fifth torque-transmitting mechanism is engaged.

In an eighth or the next subsequent forward ratio, indicated as 8th in FIG. 3, the first torque-transmitting mechanism and fourth torque-transmitting mechanism are engaged. Thus, to transition from the seventh forward ratio and upshift to the eighth forward ratio, the fifth torque-transmitting mechanism is released and the first torque-transmitting mechanism is engaged.

The present disclosure contemplates that downshifts follow the reverse sequence of the corresponding upshift (as described above), and several power-on skip-shifts that are single-transition are possible (e.g. from 1st to 3rd or 3rd to 1st).

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multiple speed transmission, comprising:
an input member;
an output member;
first, second, third and fourth planetary gearsets each having first, second and third members;
a plurality of interconnecting members each connected between at least one of the first, second, third, and fourth planetary gearsets and at least another of the first, second, third, and fourth planetary gearsets;
a first torque-transmitting mechanism selectively engageable to interconnect the first member of the fourth planetary gearset with a stationary member;
a second torque-transmitting mechanism selectively engageable to interconnect the second member of the first planetary gearset with a stationary member;
a third torque-transmitting mechanism selectively engageable to interconnect the first member of the third planetary gearset with a stationary member;
a fourth torque-transmitting mechanism selectively engageable to interconnect the first member of the first planetary gearset and the first member of the second planetary gearset with the second member of the first planetary gearset and the third member of the third planetary gearset; and
a fifth torque-transmitting mechanism selectively engageable to interconnect the first member of the third planetary gearset with the second member of the fourth planetary gearset and the third member of the first planetary gearset;
wherein the torque transmitting mechanisms are selectively engageable in combinations of two to establish up to eight forward speed ratios and one reverse speed ratio between the input member and the output member.

2. The multiple speed transmission of claim 1, wherein one member of the second planetary gearset is continuously interconnected with the input member and a different member of the second planetary gearset is continuously interconnected with the output member.

3. The multiple speed transmission of claim 2, wherein the input member is continuously interconnected with the first member of the second planetary gearset and the output member is continuously interconnected with the second member of the second planetary gearset.

4. The multiple speed transmission of claim 1, wherein the selective engagement of the second torque-transmitting mechanism and third torque-transmitting mechanism interconnect two members of the same planetary gearset to the stationary member.

5. The multiple speed transmission of claim 1, wherein the plurality of interconnecting members includes a first interconnecting member continuously interconnecting the second member of the first planetary gearset with the third member of the third planetary gearset.

6. The multiple speed transmission of claim 1, wherein the plurality of interconnecting members includes a second interconnecting member continuously interconnecting the third member of the first planetary gearset with the second member of the fourth planetary gearset.

7. The multiple speed transmission of claim 1, wherein the plurality of interconnecting members includes a third interconnecting member directly connected to the first member of the third planetary gearset.

8. The multiple speed transmission of claim 1, wherein the plurality of interconnecting members includes a fourth interconnecting member continuously interconnecting the third member of the second planetary gearset with the second member of the third planetary gearset and the third member of the fourth planetary gearset.

9. The multiple speed transmission of claim 1, wherein the plurality of interconnecting members includes a fifth interconnecting member directly connected to the first member of the fourth planetary gearset.

10. The multiple speed transmission of claim 1, wherein the second torque-transmitting mechanism is selectively engageable to interconnect the third member of the third planetary gearset with the stationary member.

11. A multiple speed transmission, comprising:
an input member;
an output member;
first, second, third and fourth planetary gearsets each having a sun gear, a ring gear, and a carrier member;
a plurality of interconnecting members each connected between at least one of the first, second, third, and fourth planetary gearsets and at least another of the first, second, third, and fourth planetary gearsets;

a first torque-transmitting mechanism selectively engageable to interconnect the sun gear of the fourth planetary gearset with a stationary member;
a second torque-transmitting mechanism selectively engageable to interconnect the carrier member of the first planetary gearset and the ring gear of the third planetary gearset with a stationary member;
a third torque-transmitting mechanism selectively engageable to interconnect the sun gear of the third planetary gearset with a stationary member;
a fourth torque-transmitting mechanism selectively engageable to interconnect the sun gear of the first planetary gearset and the sun gear of the second planetary gearset with the carrier member of the first planetary gearset and the ring gear of the third planetary gearset; and
a fifth torque-transmitting mechanism selectively engageable to interconnect the sun gear of the third planetary gearset with the carrier member of the fourth planetary gearset and the ring gear of the first planetary gearset;
wherein the torque transmitting mechanisms are selectively engageable in combinations of two to establish up to eight forward speed ratios and one reverse speed ratio between the input member and the output member.

12. The multiple speed transmission or claim 11, wherein one member of the second planetary gearset is continuously interconnected with the input member and a different member of the second planetary gearset is continuously interconnected with the output member.

13. The multiple speed transmission of claim 12, wherein the input member is continuously interconnected with the sun gear of the second planetary gearset and the output member is continuously interconnected with the carrier member of the second planetary gearset.

14. The multiple speed transmission of claim 11, wherein the selective engagement of the second torque-transmitting mechanism and third torque-transmitting mechanism interconnect two members of the same planetary gearset to the stationary member.

15. The multiple speed transmission of claim 11, wherein the plurality of interconnecting members includes a first interconnecting member continuously interconnecting the carrier member of the first planetary gorse with the ring gear of the third planetary gearset.

16. The multiple speed transmission of claim 11, wherein the plurality of interconnecting members includes a second interconnecting member continuously interconnecting the ring gear of the first planetary gearset with the carrier member of the fourth planetary gearset.

17. The multiple speed transmission of claim 11, wherein the plurality of interconnecting members includes a third interconnecting member directly connected to the sun gear of the third planetary gearset.

18. The multiple speed transmission of claim 11, wherein the plurality of interconnecting members includes a fourth interconnecting member continuously interconnecting the ring gear of the second planetary gearset with the carrier member of the third planetary gearset and the ring gear of the fourth planetary gearset.

19. The multiple speed transmission of claim 11, wherein the plurality of interconnecting members includes a fifth interconnecting member directly connected to the sun gear of the fourth planetary gearset.

20. A multiple speed transmission, comprising:
an input member;
an output member;
first, second, third and fourth planetary gearsets each having a sun gear, a ring gear, and a carrier member;
a plurality of interconnecting members each connected between at least one of the first, second, third, and fourth planetary gearsets and at least another of the first, second, third, and fourth planetary gearsets;
a first torque-transmitting mechanism selectively engageable to interconnect the sun gear of the fourth planetary gearset with a stationary member;
a second torque-transmitting mechanism selectively engageable to interconnect the carrier member of the first planetary gearset and the ring gear of the third planetary gearset with a stationary member;
a third torque-transmitting mechanism selectively engageable to interconnect the sun gear of the third planetary gearset with a stationary member;
a fourth torque-transmitting mechanism selectively engageable to interconnect the sun gear of the first planetary gearset and the sun gear of the second planetary gearset with the carrier member of the first planetary gearset and the ring gear of the third planetary gearset;
a fifth torque-transmitting mechanism selectively engageable to interconnect the sun gear of the third planetary gearset with the carrier member of the fourth planetary gearset and the ring gear of the first planetary gearset;
a first interconnecting member of the plurality of interconnecting members continuously interconnecting the carrier member of the first planetary gearset with the ring gear of the third planetary gearset;
a second interconnecting member of the plurality of interconnecting members continuously interconnecting the ring gear of the first planetary gearset with the carrier member of the fourth planetary gearset;
a third interconnecting member of the plurality of interconnecting members directly connected to the sun gear of the third planetary gearset;
a fourth interconnecting member of the plurality of interconnecting members continuously interconnecting the ring gear of the second planetary gearset with the carrier member of the third planetary gearset and the ring gear of the fourth planetary gearset; and
a fifth interconnecting member of the plurality of interconnecting members directly connected to the sun gear of the fourth planetary gearset;
wherein the torque transmitting mechanisms are selectively engageable in combinations of two to establish up to eight forward speed ratios and one reverse speed ratio between the input member and the output member.

* * * * *